United States Patent
McCarthy et al.

[11] Patent Number: 5,999,659
[45] Date of Patent: *Dec. 7, 1999

[54] APPARATUS AND METHOD FOR SMOOTHING THE LINES DRAWN BY A USER AT A COMPUTER

[75] Inventors: Dominic Paul McCarthy; David Everett Reynolds, both of Avon, United Kingdom

[73] Assignee: Hewlett-Parkard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/344,278

[22] Filed: Nov. 23, 1994

[30] Foreign Application Priority Data

Nov. 23, 1993 [GB] United Kingdom .................. 93309327

[51] Int. Cl.$^6$ ....................................................... G06K 9/60
[52] U.S. Cl. ........................................... 382/269; 382/299
[58] Field of Search ....................... 382/269, 260, 382/282, 264, 187, 188, 299, 189; 345/132, 173; 358/456

[56] References Cited

U.S. PATENT DOCUMENTS

| | | | |
|---|---|---|---|
| 4,829,370 | 5/1989 | Mayne et al. ............................ | 358/78 |
| 5,231,519 | 7/1993 | Koike ..................................... | 358/456 |
| 5,270,836 | 12/1993 | Kang ..................................... | 382/299 |
| 5,272,469 | 12/1993 | Memarzadeh ........................... | 345/173 |
| 5,276,787 | 1/1994 | Searby ................................... | 345/173 |
| 5,283,557 | 2/1994 | Memarzadeh ........................... | 345/132 |
| 5,408,593 | 4/1995 | Kotaki et al. ............................ | 395/122 |
| 5,410,621 | 4/1995 | Hyatt ...................................... | 382/260 |
| 5,432,898 | 7/1995 | Curb et al. .............................. | 395/143 |
| 5,434,959 | 7/1995 | Von Ehr, II et al. ..................... | 395/143 |
| 5,448,044 | 9/1995 | Price et al. .............................. | 345/173 |
| 5,539,843 | 7/1996 | Murakami et al. ...................... | 358/456 |
| 5,572,596 | 11/1996 | Wildes et al. ........................... | 382/190 |
| 5,629,988 | 5/1997 | Burt et al. ............................... | 382/276 |
| 5,767,828 | 6/1998 | McKnight ............................... | 345/173 |

FOREIGN PATENT DOCUMENTS

WO91/11774  8/1991  WIPO .............................. G06F 15/72

OTHER PUBLICATIONS

Foley et al. 'computer graphics:principles and practice' 1990, Addison Wesley, USA pp. 628–647; figure 14, 32*.

SID. International Syposium.Digest of Techn ical Papers May 12, 1987, USA –pp. 398–401 Oakley et al. Turbo Convolution: a fast antialiasing algorithm for dejaggin raster graphics displays.

Computer Design vol. 25, No. 11, Jun. 1986, USA—pp. 25–30 Tom Williams 'board level image processors enter destop arena'.

*Primary Examiner*—Andrew W. Johns

[57] ABSTRACT

A pen-based computer in which the lines drawn by a user are anti-aliased incrementally by applying a smoothing filter to the relatively high resolution pen sensor image and subsampling the result to provide a relatively low resolution image which is displayed using greyscale.

22 Claims, 6 Drawing Sheets

APPARATUS AND METHOD FOR SMOOTHING THE LINES DRAWN BY A USER AT A COMPUTER

TECHNICAL FIELD

The present invention relates to rendering freehand input to a computer system and is concerned particularly with smoothing the lines drawn by a user of a pen-based computer.

Pen-based computers are normally portable and therefore require lightweight input/output display screens. The display is often the most expensive component in these devices and LCD (liquid crystal display) screens are normally used. Devices capable of receiving freehand input usually include a pen/stylus for the user to make freehand input onto the display screen. Such devices include a sensor for detecting the freehand user input associated with the screen.

The term freehand input is intended to cover all types of input made by the user with a pen on the input screen of a pen-based computer including handwriting, drawing and any other form of scribble. The present invention would also apply to computers permitting the user to write, draw, scribble with devices other than pens and/or directly with a finger should these become available.

BACKGROUND ART

Capturing handwriting on an LCD using some form of pen sensor has previously been performed by calculating the pen position and drawing a vector or spline from the last known pen position. The algorithm for drawing the vector or spline typically involves simply turning pixels on the curve on or off as appropriate. The resultant effect of such drawing is aliasing, i.e., a rather jagged line at the LCD screen resolutions of 90 dpi (dots per inch) which are commonly used today.

Greyscale, which is the use of levels of grey rather than simply black and white, makes an image appear to be of higher resolution than it actually is and can help to create the appearance of smoother lines in a pen-based computer. In this specification the term 'n-level greyscale' means the actual number of greyscale levels, not the number of bits needed to store each greyscale value. For example, 4-level greyscale would require 2 bits of storage.

One known approach utilizing greyscale to achieve anti-aliasing of lines drawn on computer screens is the 'partial inking' approach and a useful reference is a book titled 'Computer Graphics: Principles and Practice' published by Addison Wesley, 1990. Partial inking involves calculating the ink level for pixels according to what fraction of the pixel would be covered by the (theoretical) line being drawn. This is a relatively crude approach which has the advantage of being low in cost but which is rather limited in the quality of result which can be achieved.

Another approach utilizing greyscale, and the one that is relevant to the present invention, involves digital sampling and filtering.

Generally, to render an image on a computer screen, the image must be sampled, i.e., digitized. The aliasing is the direct effect of sampling a continuous image which includes frequencies above the Nyquist limit. For a sampling frequency of f, the maximum frequency of the continuous image must be less than f/2. If this condition is not met, the sampling of higher frequencies causes extra, low frequency, components to be created which distort the resultant image. To prevent this problem, the continuous image needs to be passed though a low pass filter that cuts off at f/2 before sampling.

The article by Blinn entitled "What we need around here is more aliasing" in the IEEE Computer Graphics and Applications, 9(1): 75–79, January 1989 is helpful background reference material on the general topic of anti-aliasing.

Considering the problem of rendering freehand input onto a computer screen, it is desirable to render at the finest possible resolution, i.e., line widths of one pixel. However, this is the worst case for digitization distortions because then the freehand lines jump between full width and negligible width along their length.

DISCLOSURE OF INVENTION

The present invention aims to provide a computer having means for displaying freehand input in which the freehand input is anti-aliased in order to smooth the lines drawn and to improve its appearance.

The present invention provides a computer comprising:

means enabling a user to make freehand input;

a display having a first resolution and capable of displaying images using at least four level greyscale;

sensing means for capturing freehand input and from which an image definition at a second resolution ('high resolution image') can be derived, where the second resolution is greater than the first resolution;

means for using information from the high resolution image incrementally to display, at the first resolution, an anti-aliased version of the freehand input ('output').

The term 'image definition' is used above to cover cases where the image defined by the sensing means is not made visible to a user and/or is never stored as a composite image as well as cases where the image is displayed and/or stored as a composite image.

The present invention has the advantage of carrying out the anti-aliasing of freehand input incrementally, i.e., dynamically, so that the resultant lines appear smoother to the user as they are drawn.

Preferably the system comprises means for filtering the high resolution image and for sub-sampling the filtered high resolution image so as to produce the output.

In the embodiment to be described the second resolution is that of the pen sensor.

Advantageously the computer comprises means for applying the filtering means only to those elements of the high resolution image which will appear in the output.

In a preferred embodiment, the computer comprises means for processing the relevant elements of the high resolution image irrespective of whether they have been previously processed. In that embodiment, preferably there are means for setting elements of the output to the maximum greyscale level, if otherwise, the maximum greyscale level would be exceeded.

Preferably, the computer is operable to apply a convolution kernel incrementally to each new part of a line as it is being drawn. The convolution kernel is preferably a discrete approximation of the sinc kernel. In an embodiment to be described, the convolution kernel which is applied to each new part of a line as it is drawn by a user is a triangular approximation of the sinc kernel, namely:

$$1/16 \begin{pmatrix} 1 & 2 & 1 \\ 2 & 4 & 2 \\ 1 & 2 & 1 \end{pmatrix}$$

Preferably the second resolution is an integral number of times greater than the first resolution. In the embodiment to be described the second resolution is twice that of the first resolution.

Preferably a computer according to the present invention is operable to display input at or below sixteen level greyscale.

BRIEF DESCRIPTION OF DRAWINGS

Embodiments of the present invention will now be described, by way of example, with reference to the accompanying drawings in which.

The embodiments of the present invention which will be described involve using output from a line drawing algorithm at a high resolution, filtering it and sub-sampling to give an anti-aliased image at a low resolution. Conceptually there are three relevant images:

i) a high resolution binary image which shows the image pixels which are newly to be inked, i.e., it indicates image pixel changes;

ii) a high resolution greyscale image which is the image which results from subjecting the high resolution binary image to low pass filtering using a convolution kernel; and iii) a low resolution greyscale image which results from sub-sampling the high resolution greyscale image.

In practice, it is not necessary actually to store all of the three images i)–iii) described above as will be explained in the following descriptions of preferred embodiments.

The low pass filtering of the high resolution greyscale image can be achieved by performing a convolution with a suitable function. In the context of the present invention, the image to be filtered is not continuous, but is a discrete image sampled at the pen sensor resolution, i.e., new strokes need to be added in incrementally as they arrive from the pen, therefore a discrete convolution needs to be performed on the pen image.

To perform this incremental rendering the required filtering step is linear. In the case of a high resolution binary image I with its corresponding smoothed image G, adding one more pixel p into I gives a new image I' and the corresponding image G' can be calculated by:

$$G'=G+(p \otimes X\ K)$$

where K is the smoothing kernel and $\otimes$ *represents convolution with the kernel K.*

In other words, a new copy of the smoothing kernel, scaled appropriately, needs to be added in, centered at the location of the new pixel.

The process is more efficient if only the values of G' which will actually be required are calculated, i.e., only smoothing changes which affect pixels which will be displayed in the final image are calculated. Since the display will be sub-sampled, we can say:

display=subsample (G)

Consequently, in the incremental case:

display'=subsample (G+(p$\otimes$K)) =display+subsample (p$\otimes$K).

It is well known that the ideal convolution kernel for filtering out high frequency components in a continuous image is the function:

f(x)=sincIIx=sin(II x)/IIx

Figure 1:
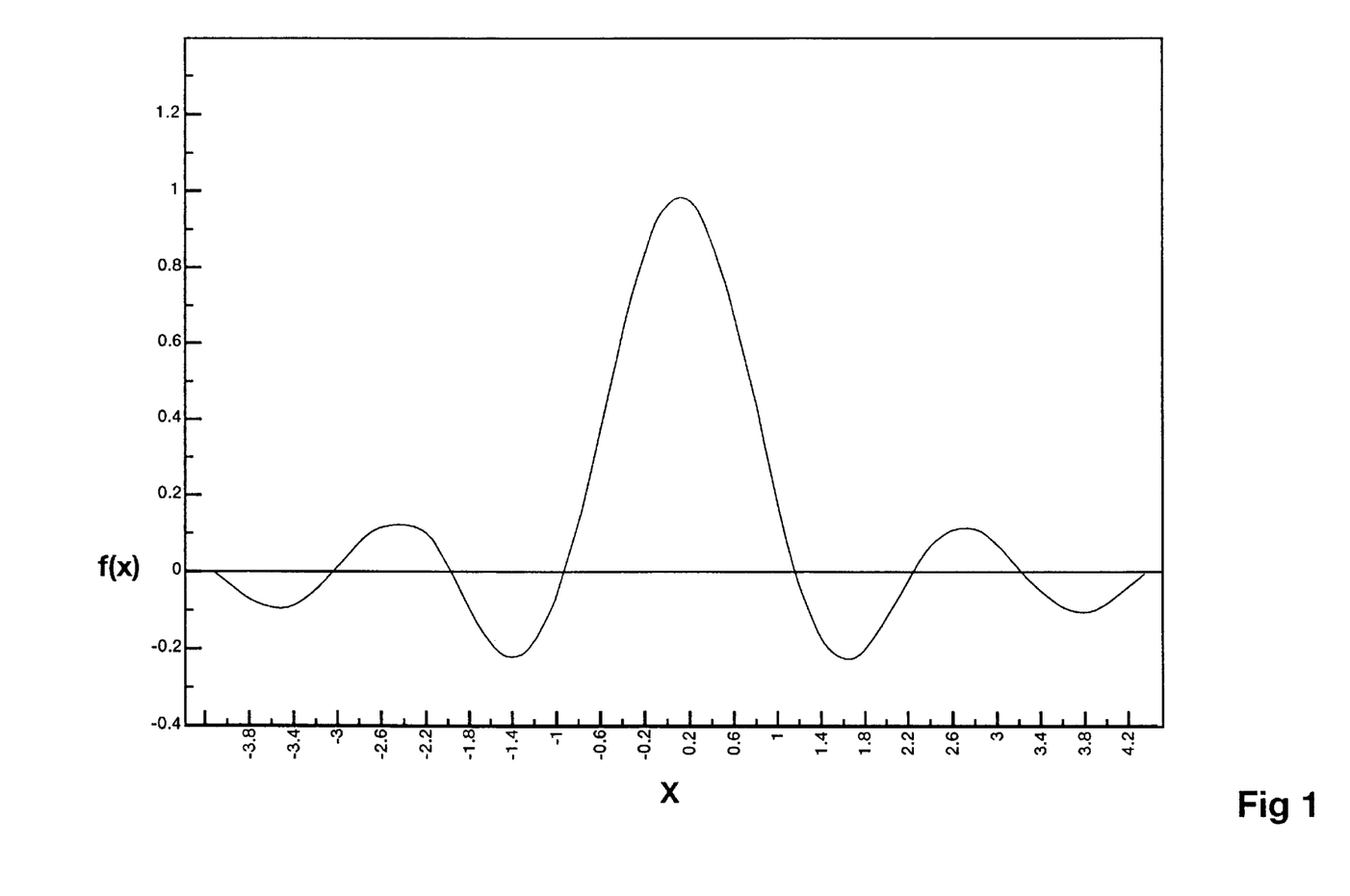
FIG. 1 shows the sinc function, where sinc IIx=sin(Ix)/IIx, where II is pi.
Figure 2:
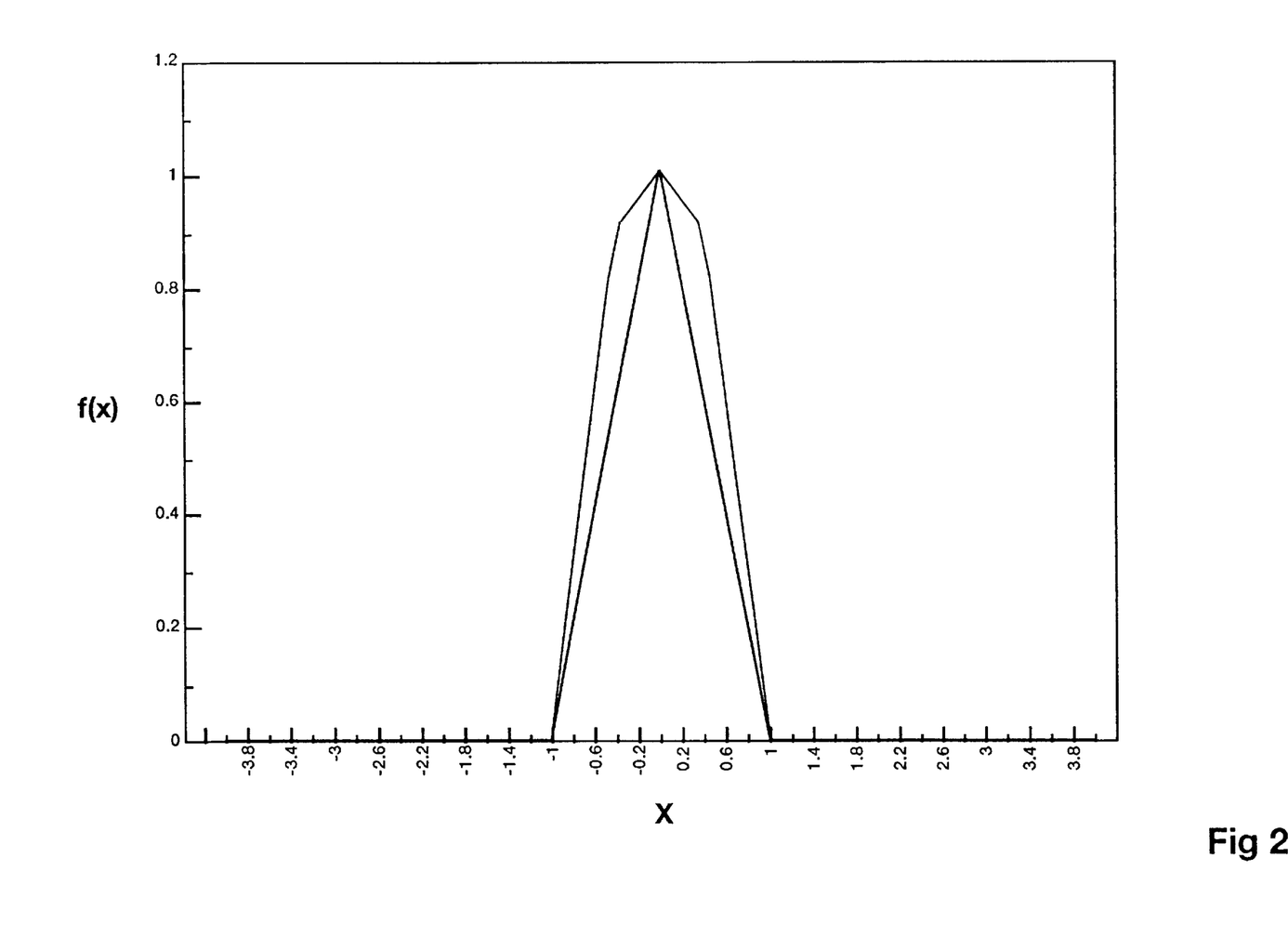
FIG. 2 shows a triangular function which approximates the sinc function.

This function is illustrated in FIG. 1 and continues oscillating around the x-axis with diminishing amplitude to plus and minus infinity. In order to carry out discrete convolution, an approximation to the sinc IIx function is used. An approximation of the sinc kernel which is a triangular function that maps quite well to the central lobe of the sinc function but does not include the negative lobes is shown in FIG. 2.

The kernel extracted from this function is (4 7 4)/15 which approximates to (1 2 1) /4. Since an image is two-dimensional, this needs to be expanded to its 2D equivalent, namely:

$$1/16 \begin{pmatrix} 1 & 2 & 1 \\ 2 & 4 & 2 \\ 1 & 2 & 1 \end{pmatrix}$$

This is the preferred smoothing kernel for use in connection with the present invention although there are many others which could be used.

Preferred embodiments of the present invention will now be described, by way of example.

Figure 3:
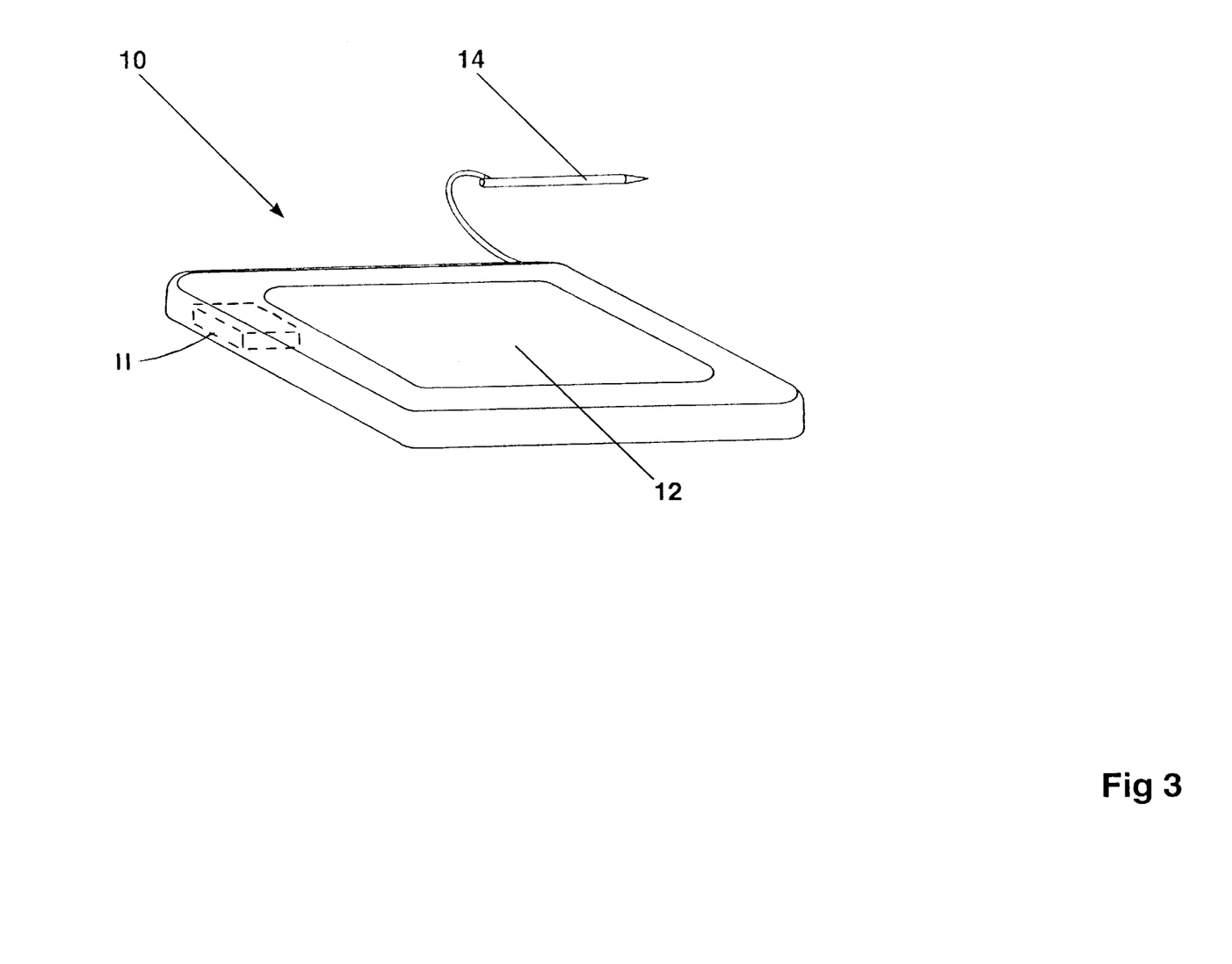
FIG. 3 is a diagram of a pen-based computer according to the present invention.

Referring to FIG. 3, a computer 10 comprises a screen 12 and a pen 14. The screen 12 is both for displaying images to the user and for sensing input from the pen 14. The computer also comprises a controlling microchip (shown in phantom lines) such as an Intel (tradename) 386 chip, random access memory and further storage capacity.

Figure 4:
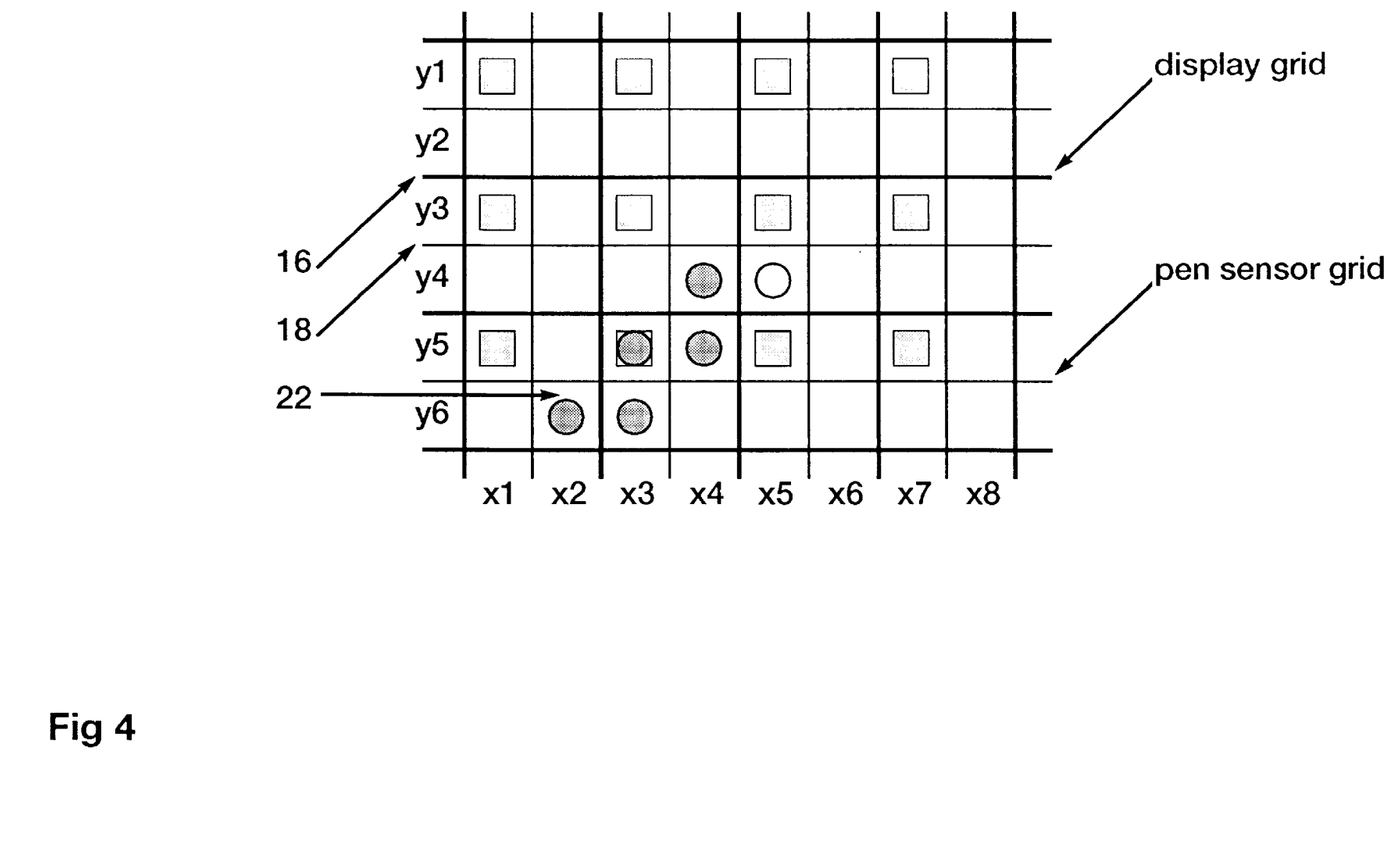
FIG. 4 is a diagram of the display and pen sensor grids of the computer of FIG. 3.

FIG. 4 shows a display grid 16 in bold lines and a pen sensor grid 18 in light lines, both of which are associated with the screen 12. The display grid shows the size of the display pixels of the screen 12. The pen sensor grid 18 indicates the pen sensor resolution and shows the size of the elements for sensing pen input—these will be called 'image pixels'. The resolution of the display grid is half that of the pen sensor grid, i.e., there are four image pixels for each display pixel.

Figure 5:
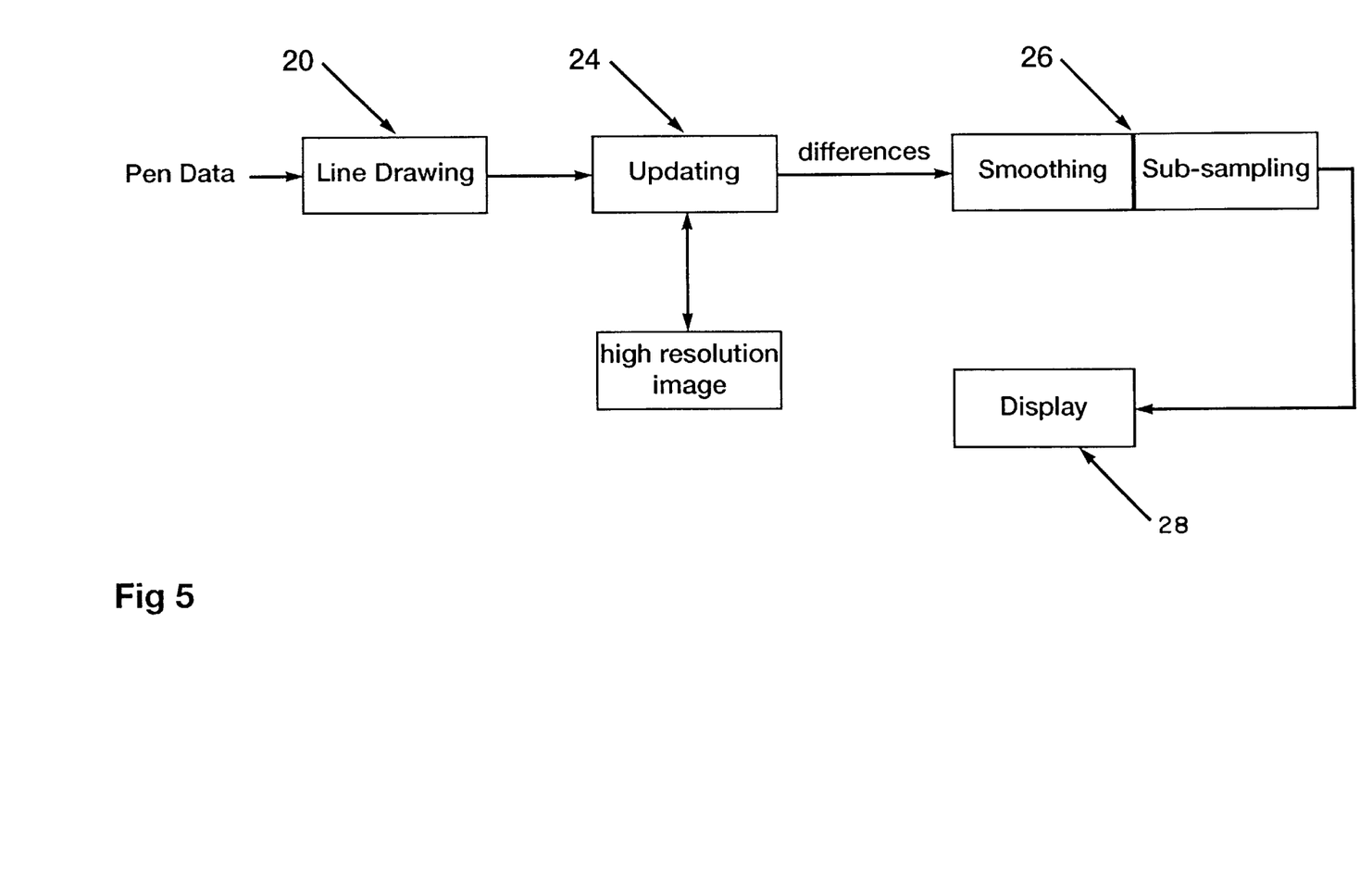
FIG. 5 is a block diagram of a first embodiment of the present invention.

FIG. 5 represents the components of a first embodiment of a system according to the present invention implemented in software.

Referring to FIG. 5, a line drawing component 20 which utilizes a standard line drawing algorithm such as the standard midpoint digital line drawing algorithm takes input from the pen sensor grid 18 and generates the successive positions of a 2-image-pixel-wide 'brush' which defines a line being drawn and shown as dark circles in FIG. 4, referenced as 22. An updating component 24 calculates which pixels are newly to be inked and provides this information to a smoothing/subsampling component 26.

The smoothing/subsampling component 26 adds in the chosen smoothing kernel at the location of the new pixels and calculates the greyscale values of only the pixels which will appear in the final low resolution image and supplies this information to a display component 28 which caused the anti-aliased image to be displayed.

Pseudo-code for this process is as follows:
renderLinePoint(x,y){
1. Locate the line drawing algorithm brush and intersect it with the ink trail
2. For each image pixel within the intersection which has not already been inked
{2.1 determine the alignment of the image pixel on the display grid
2.2 apply the appropriate part of the smoothing kernel to the relevant subsample of the image pixels
2.3 update the relevant display pixels in the low resolution image at (x/2, y/2)}}

Referring again to FIG. 4, the values of the image pixels containing a hatched rectangle are the ones which are used by the display grid after sub-sampling the image grid. For a grey-scaled display, these values will range from zero to the number of grey levels minus one, e.g., for a display with eight grey levels, the values range from zero to seven. If the number of grey levels equals the normalization factor of the kernel this means that the normalization factor cancels out and can be ignored. Otherwise a normalization factor equal to the number of grey levels divided by the sum of the entries in the kernel needs to be used.

In the example shown in FIG. 4, the line drawing algorithm needs to set image pixel (x5,y4). The next step is to overlay the 2D smoothing kernel so that its centroid lies on (x5,y4). This will affect display pixels (x5,y3) and (x5,y5), both needing to have the value 2 added to them. This means that these two display pixels will have their greyscale levels increased by 2. Although in theory there are seven other elements of the image grid which are affected by the 2D convolution kernel, there is no point in calculating the effect on these seven other image pixels because they will not contribute to the sub-sampled image. In this way the filtering and sub-sampling steps are combined.

Thus the reference to 'the appropriate part of the smoothing kernel' in section 2.2 of the pseudo-code above means that only those parts of the smoothing kernel which apply to the display pixels are added in. This depends on the position of the new image pixel relative to the display grid. FIG. 4 shows that each display pixel contains four image pixels and the four possible positions of an image pixel relative to the corresponding display pixel can be expressed as: top left, top right, bottom left and bottom right. For example, the image pixel x5,y4 in FIG. 4 is in the bottom left position. The parts of the kernel corresponding to the four possible positions of an image pixel relative to a display pixel are:

$$\text{top left:} \begin{pmatrix} 4 & 0 \\ 0 & 0 \end{pmatrix} \quad \text{top right:} \begin{pmatrix} 2 & 2 \\ 0 & 0 \end{pmatrix}$$

$$\text{bottom left:} \begin{pmatrix} 2 & 0 \\ 2 & 0 \end{pmatrix} \quad \text{bottom right:} \begin{pmatrix} 1 & 1 \\ 1 & 1 \end{pmatrix}$$

This approach is taken for each new image pixel drawn and the result is that, as a line is drawn by a user, the effect of setting the image pixels is determined and the relevant display pixels are updated to produce a smoothed line.

There is a further simplification which can be made and which will now be described with reference to a second embodiment of the present invention.

A feature of handwriting is that there are intersections, retraces and complex curvature changes. In the embodiment described above, knowledge about which image pixels have previously been set is retained and used so that the value of any display pixel is automatically limited to the allowed greyscale levels and intersections are not inked over repeatedly.

However, rather than storing information about which image pixels have already been set (requiring four bits of information to be stored for each one of the four image pixels within every display pixel in a sixteen grey-level system), an approximation can be made. The approximation is to ink image pixels whether or not they have been previously inked and to allot a value of the maximum grey level to a display pixel which is in the path of a line being drawn. This approximation assumes that it is acceptable to degrade the intersections of lines and that these always tend to black. Using this approximation, there is no need to keep track of which image pixels have previously been inked.

Figure 6:
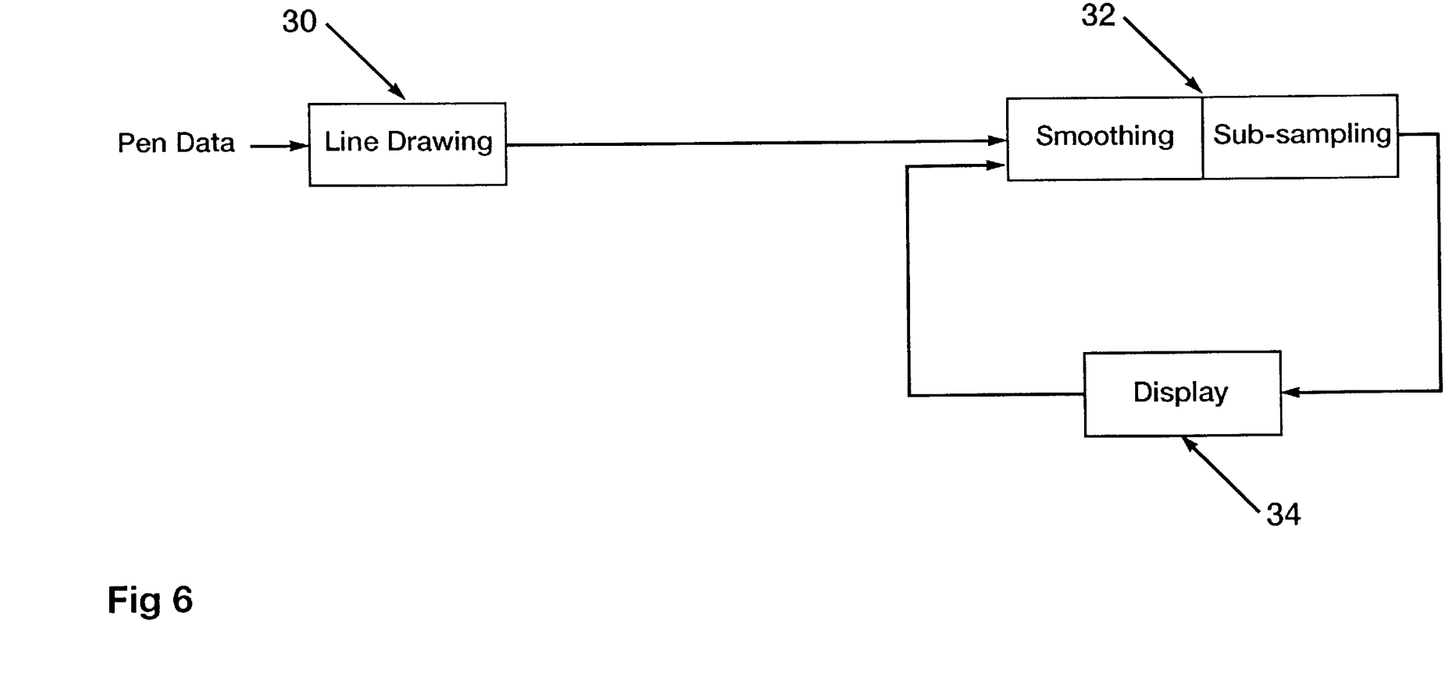
FIG. 6 is a block diagram of a second embodiment of the present invention.

FIG. 6 shows the components in a system according to the second embodiment of the present invention implemented in software.

Referring to FIG. 6, a line drawing component 30, which utilizes a standard line drawing algorithm, such as the standard midpoint digital line drawing algorithm takes input from the pen sensor grid 18 and generates the successive positions of the 2-pixel wide brush, shown as dark circles in FIG. 4 and referenced as 22, and provides this information to a smoothing/subsampling component 32.

The smoothing /subsampling component 32 adds in the chosen smoothing kernel at the location of the newest image pixels and calculates the greyscale values of only the display pixels, i.e., those which will appear in the final low resolution image and supplies this information to a display component 34 which causes the anti-aliased image to be displayed. Display pixels are updated whether or not they were inked before except that if the updating would cause the greyscale value to exceed the permitted maximum, it is instead set to that maximum.

Pseudo-code for this process is as follows:
renderLinePoint(x,y) {
1. For each image pixel in brush to be inked
{1.1 determine the alignment of the image pixel on the display grid
1.2 apply the appropriate part of the smoothing kernel to the relevant subsample of the image pixels
1.3 update the relevant display pixels in the low resolution image at (x/2, y/2)
1.3.1 check value of display pixel and if overflow condition then set to black else update to new value}}

In this embodiment therefore the overhead of storing a binary image at the high resolution in order to isolate the newly inked pixels is removed. Instead the smoothing/subsampling component 32 refers to the low resolution display in order to ascertain whether a particular display pixel has already been inked and, if so, still updates that display pixel but sets it to black if otherwise the maximum greyscale level would have been exceeded.

A different smoothing kernel can be chosen than the triangular approximation to the sinc function described above. There are many other well-known approximations to the sinc function which may give acceptable performance according to particular requirements. An example is:

$$\begin{pmatrix} 0 & -1 & -2 & -1 & 0 \\ -1 & 3 & 6 & 3 & -1 \\ -2 & 6 & 12 & 6 & -2 \\ -1 & 3 & 6 & 3 & 1 \\ 0 & -1 & -2 & -1 & 0 \end{pmatrix}$$

The greyscale level chosen is desirably relatively low, e.g. 4, 8 or 16 (it being uncommon to have greyscale levels which are not powers of two) in order to keep costs down because it is considered that relatively low greyscale levels produce acceptable results in connection with the present invention.

In the embodiment described above the resolution of the pen sensor is the same as that of the second resolution image which is sub-sampled to produce anti-aliased output at the lower resolution of the output display. It will be understood that the resolution of the pen sensor may be higher than that of the second resolution and may itself be sub-sampled to define the second resolution image which is in turn sub-sampled and filtered to provide the anti-aliased output.

The resolution ratio of 2:1 between the second resolution image and the display grid is convenient but not essential. Different resolution ratios could be used and even non-integral resolution ratios except that these would introduce complications. The size and form of the smoothing kernel would need to be chosen accordingly.

It will readily be appreciated that the present invention could also be implemented in hardware by hard-coding the components for implementing the line drawing algorithm and the smoothing and subsampling in a dedicated device.

We claim:

1. A computer comprising:
   a freehand input device enabling a user to make a freehand input;
   a display having a first resolution and capable of displaying images using at least four level greyscale;
   a freehand input sensor for capturing freehand input as a binary image having an image definition at a second resolution, where the second resolution is greater that the first resolution; and
   a filter system for filtering said image definition at a second resolution with a weighted convolution kernel to produce a low-pass filtered high resolution greyscale image and for sub-sampling the low-pass filtered high resolution greyscale image so as to incrementally display as an output, at the first resolution, an anti-aliased version of the freehand input.

2. The computer according to claim 1 further comprising means for applying the relevant part of the convolution kernel only to those elements of the high resolution greyscale image which will appear in said output.

3. The computer according to claim 1 further comprising means for processing the relevant elements of the high resolution greyscale image irrespective of whether they have been previously processed.

4. The computer according to claim 3 further comprising means for setting elements of the output to the maximum greyscale level if otherwise the maximum greyscale level would be exceeded.

5. The computer according to claim 1 which is operable to apply a convolution kernel incrementally to each new part of a line as it is being drawn.

6. The computer according to claim 5 wherein the convolution kernel is a discrete approximation of the sinc kernel.

7. The computer according to claim 6 wherein the convolution kernel is a triangular approximation of the sinc kernel.

8. The computer according to claim 7 wherein the convolution kernel is substantially:

$$1/16 \begin{bmatrix} 1 & 2 & 1 \\ 2 & 4 & 2 \\ 1 & 2 & 1 \end{bmatrix}.$$

9. The computer according to claim 1 in which the second resolution is an integral number of times greater than the first resolution.

10. The computer according to claim 9 in which the second resolution is twice that of the first resolution.

11. The computer according to claim 1 which is operable to display output at or below sixteen level greyscale.

12. A method of displaying freehand input to a computer system, said system including a display having a first resolution and capable of displaying images using at least four level greyscale and further including a freehand input sensor for capturing freehand input as a binary image having an image definition at a second resolution, where the second resolution is greater than the first resolution, the method comprising the following steps:
   low-pass filtering said image definition at a second resolution with a weighted convolutional kernel to produce a filtered high resolution greyscale image; and
   sub-sampling said low-pass filtered high resolution greyscale image and incrementally displaying as an output, at the first resolution, an anti-aliased version of the freehand input.

13. The method according to claim 12 further comprising applying a relevant part of the convolution kernel only to those elements of the binary image which will appear in said output.

14. The method according to claim 13 further comprising processing relevant elements of the binary image at a second resolution irrespective of whether they have been previously processed.

15. The method according to claim 14 further comprising setting elements of the output to a maximum greyscale level if otherwise the maximum greyscale level would be exceeded.

16. The method according to claim 12 further comprising applying the convolution kernel incrementally to each new part of a line as it is being drawn.

17. The method according to claim 16 wherein the convolution kernel is a discrete approximation of a sinc kernel.

18. The method according to claim 17 wherein the convolution kernel is a triangular approximation of the sinc kernel.

19. The method according to claim 12 wherein the convolution kernel is substantially $$1/16 \begin{bmatrix} 1 & 2 & 1 \\ 2 & 4 & 2 \\ 1 & 2 & 1 \end{bmatrix}.$$

20. The method according to claim 12 in which the second resolution is an integral number of times greater than the first resolution.

21. The method according to claim 20 in which the second resolution is twice that of the first resolution.

22. The method according to claim 12 wherein the step of incrementally displaying includes displaying said output at or below sixteen level greyscale.

* * * * *